Oct. 27, 1964  J. E. WITZKY ETAL  3,154,059
STRATIFIED SPARK IGNITION INTERNAL COMBUSTION ENGINE
Filed Oct. 25, 1962  4 Sheets-Sheet 1
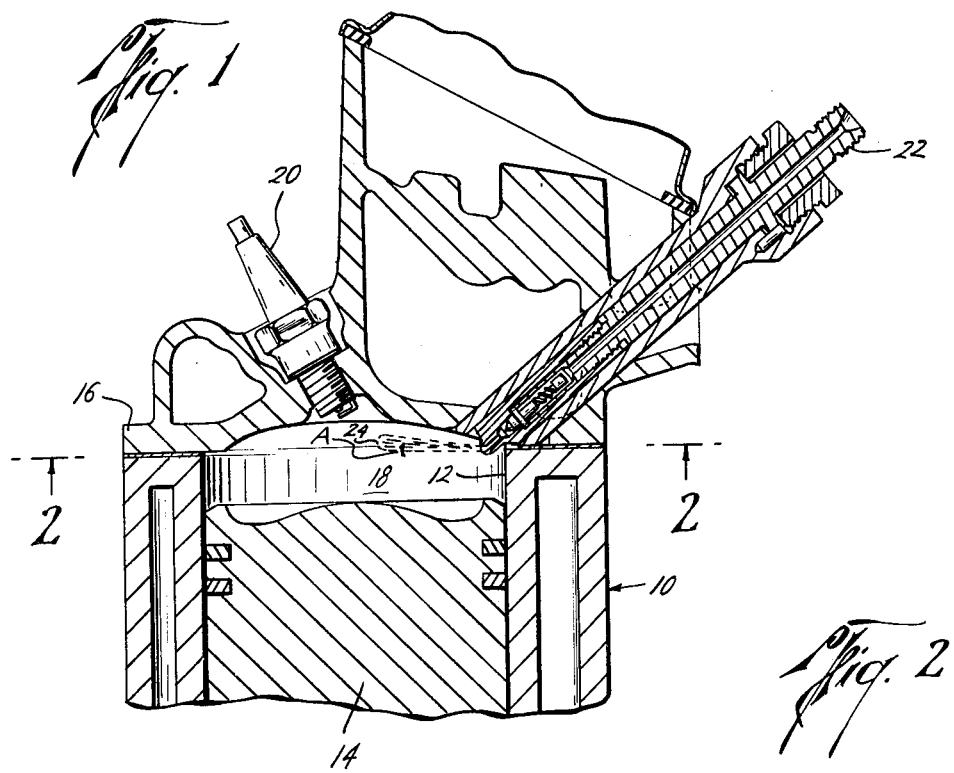
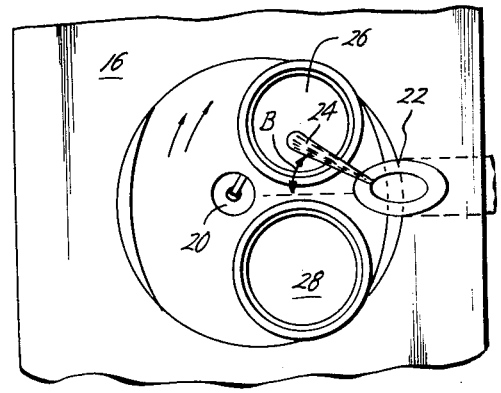
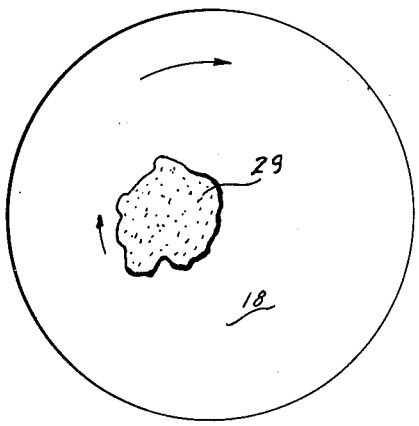
Julius E. Witzky
John M. Clark, Jr.
INVENTORS
BY
ATTORNEYS

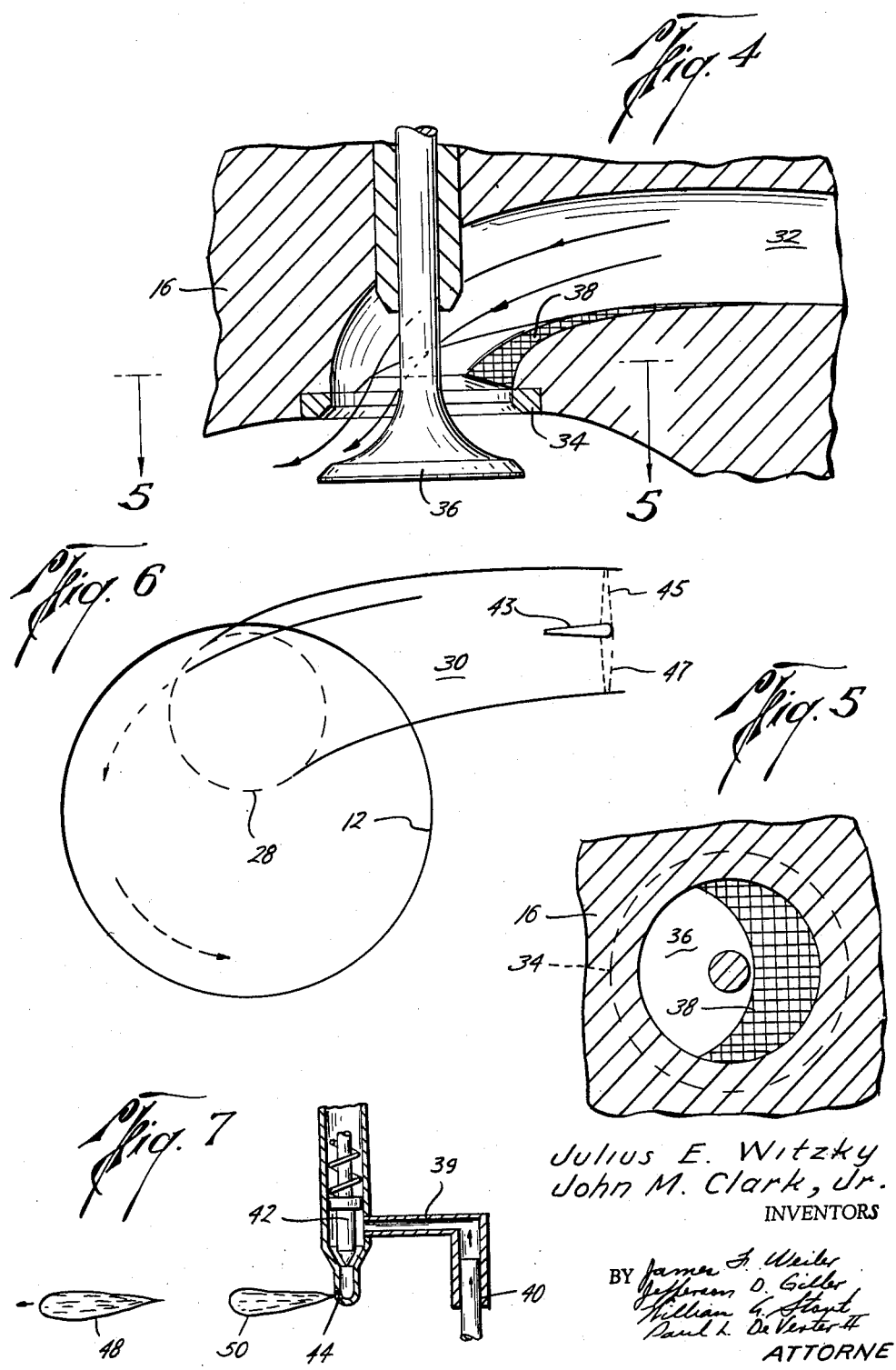

Oct. 27, 1964     J. E. WITZKY ETAL     3,154,059
STRATIFIED SPARK IGNITION INTERNAL COMBUSTION ENGINE
Filed Oct. 25, 1962                                                 4 Sheets-Sheet 3
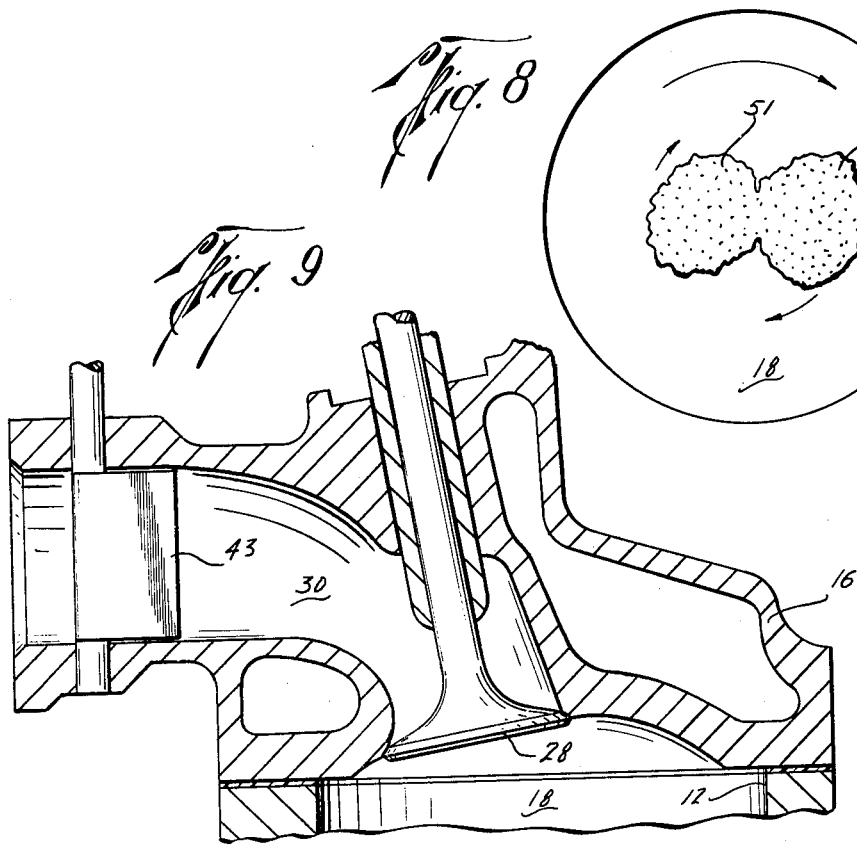
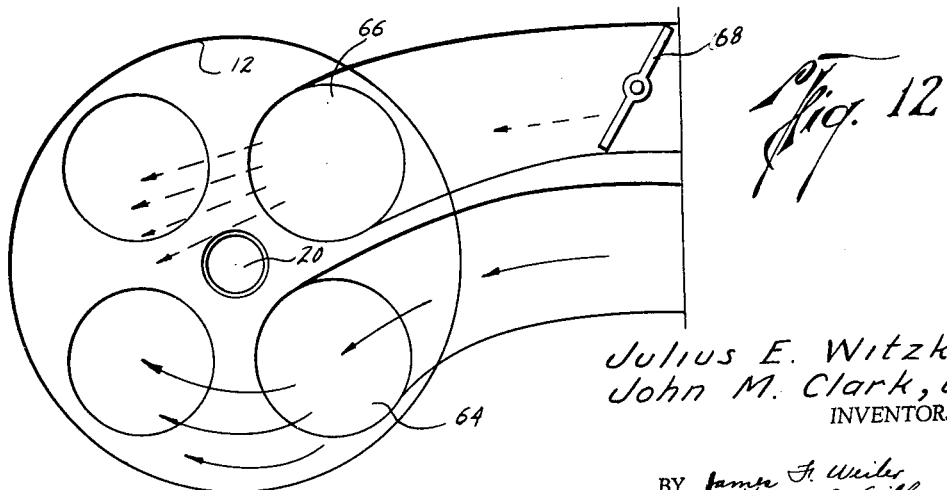
Julius E. Witzky
John M. Clark, Jr.
INVENTORS
BY
ATTORNEYS

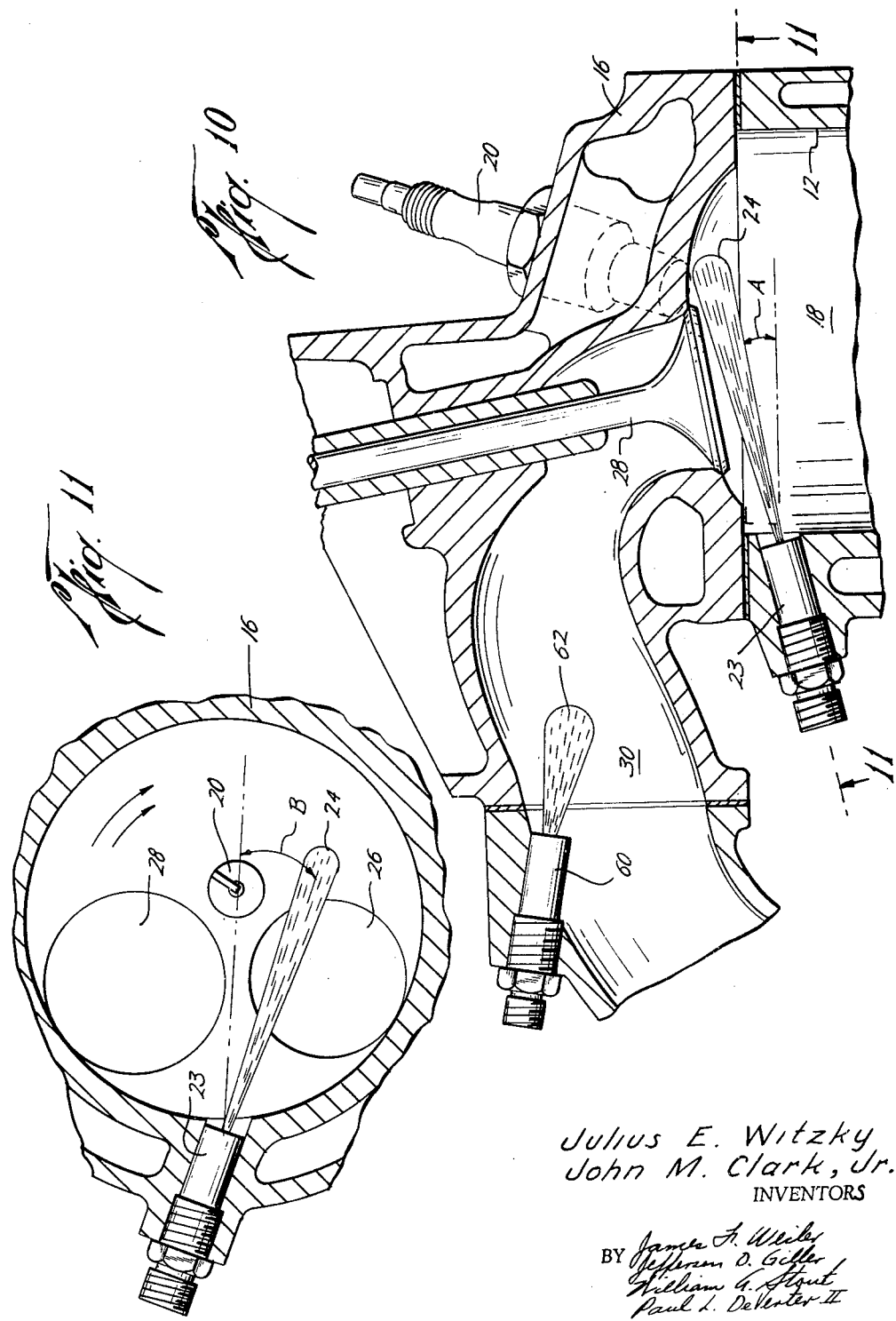

United States Patent Office 3,154,059
Patented Oct. 27, 1964

3,154,059
STRATIFIED SPARK IGNITION INTERNAL
COMBUSTION ENGINE
Julius E. Witzky and John M. Clark, Jr., San Antonio, Tex., assignors to Southwest Research Institute, San Antonio, Tex., a trust estate of Texas
Filed Oct. 25, 1962, Ser. No. 232,937
16 Claims. (Cl. 123—32)

The present invention relates to a spark ignited stratified internal combustion engine, and more particularly relates to various improvements in such an engine. This application is directed to improvements to Patent No. 2,882,873 of J. E. Witzky, dated April 21, 1959, entitled Stratified Spark Ignition Internal Combustion Engine.

As is well known, in the use of spark ignition or Otto cycle engines, there are certain limits within which a mixture of fuel and air are ignitable. The practical limits of ignition are approximately in the range between 8 to 1 and 18 to 1 for the air to fuel ratio; that is, pounds of air to pounds of fuel in a homogeneous mixture. A conventional spark ignition engine operating with the homogeneous air and fuel mixture must throttle the air intake to reduce the amount of air at partial loads in order to provide an air-fuel mixture within the ignitable range when the fuel input is reduced at low speeds or low power outputs. A stratified engine, on the other hand, concentrates its fuel in the vicinity of the spark plug so that the air to fuel ratio in the vicinity of the spark discharge is within the ignitable limits. With a stratified charge it is therefore not necessary at partial loads to throttle the air intake into the engine.

That is, with a stratified charge, the overall air-fuel ratio within the cycle may run as high as 40 to 50 to 1, well outside of the ignitable limits, but combustion is still able to occur in the fuel rich area or stratified charge which is in close proximity to the spark plug. This has several important advantages. First, the stratified charge engine with this excess air at low outputs, at which most automobile engines run, results in an efficient and thorough combustion of the available fuel in the chamber. The combustion of the fuel in an oxygen rich environment permits the combustion process to approach closer to 100% completion and thereby results in an engine which is not only more efficient, but one which is likely to overcome the smog problem in our major cities in that the stratified engine exhausts less unburned hydrocarbons than the conventional internal combustion engine.

In addition, by concentrating the burning fuel in the center of the cylinder with little or no fuel at the periphery of the cylinder, the stratified engine avoids crank case blowby, that is, leakage of the high pressure gases within the cylinder past the piston rings. This fuel concentration in the center also prevents the tendency of an engine to knock as the fuel is extremely lean at the periphery of the combustion chamber so it is not as prone to detonate. As a result, lower octane fuel can be used.

However, one of the most important features of the stratified charge engine lies in the promise of greater fuel economy, particularly in the case of large displacement engines operating in the majority of our present day passenger vehicles. At cruising speeds the average vehicle requires only a small portion of its total engine output to maintain its speed. However, at low output the present day internal combustion engines are relatively inefficient and consume a relatively large quantity of fuel per B.H.P./hour. One of the reasons for this inefficiency is that if the engine is running at only partial load, the intake air valve must be throttled to reduce the amount of air taken into the cylinder in order to maintain the proper or ignitible air/fuel ratio. However, when the air intake is throttled the air intake pressure in the intake manifold is considerably less than is the case in an unthrottled operation. This difference in pressure is reflected in higher pumping losses and higher friction horse power. In addition, another detrimental effect of the throttled cycle as compared with an unthrottled cycle is the expansion of the residual gases in the combustion chamber. At cruising outputs the volume of residual gases in the combustion chamber of a throttled cycle engine is approximately twice the volume in relation to the volume of residual gases in an unthrottled cycle. Since it is necessary to maintain an air-fuel mixture within the combustible air-fuel ratio range it is necessary to add extra fuel to the incoming air charge to compensate for the fuel that will be mixed with the non-combustible residual gases and which will not be ignited. The end product of the increased friction horse power, increased pumping losses and the enrichment of the mixture to compensate for the increase of residual gas content results in an increase of the b.s.f.c. at the lower engine speeds and outputs for the throttled engine. However, the stratified engine works with an unthrottled air intake and instead of reducing the amount of air to obtain the correct combustible air-fuel mixture, merely uses a stratified charge wherein the combustible mixture is positioned adjacent to the spark plug and the excess air is positioned about the stratified charge. Thus, increased pumping losses are avoided, and since more fresh air in relation to the residual gases is utilized than in the throttled engine, an increase in efficiency results.

Another important advantage of the stratified engine appears to be that since it has an excess of air available in the combustion chamber, similar to the diesel cycle, which aids in complete combustion of the fuel, there are fewer carbon deposits in the engine therefore an increased period between overhauls may be expected. In addition, the carbon deposits on the intake valve stem are reduced as the intake valve is unthrottled, eliminating the partial vacuum in the intake manifold and preventing the suction of oil into the combustion chamber from the valve rocker assemblies during the intake or suction cycle.

It is therefore a general object of the present invention to provide various improvements in the stratified engine to improve its operating characteristics to obtain as complete combustion of the fuel as possible. One feature of the present invention is the injection of the fuel into the combustion chamber at an angle of approximately 10° above the horizontal plane of the engine which results in the impingement of a considerable portion of the injection spray on the inner surface of the cylinder head and the subsequent evaporation of fuel from this hot surface contributes to an improved stratification of the injected fuel.

A further object of the present invention is the provision of an improved stratification of the injected fuel by providing dual injection of the fuel in a single cycle, thus providing two separate consecutive discharges of fuel, providing two mixtures of fuel swirling within the combustion chamber, and providing a better mixture of fuel in the stratified charge.

A still further object of the present invention is to provide an improved stratified engine in which the fuel injection nozzle is positioned to discharge fuel into the combustion chamber at an angle from the longitudinal axis of the cylinder and towards the cylinder wall of approximately 30° and into and against the swirling air in order to provide the necessary stratified charge adjacent the spark plug.

Yet a further object of the present invention is the provision of a modified intake air passageway to direct the intake air to an angle to the cylinder wall to provide the necessary swirling action of the air for producing the stratified air-fuel charge in the center of the cylinder and adjacent the spark plug.

A still further object of the present invention is the provision of means such as a movable vane in the intake air passageway for varying the air swirl rate within the combustion chamber as the speed and load is varied in the engine. Thus the optimum swirl rate for the various speeds and loads may be obtained.

The advantages of operating a spark ignited, internal combustion engine with a stratified charge at partial loads has been previously discussed. However, it is not desirable to utilize the stratified charge at full load operation as in that operating condition the air-fuel mixture would be richer than desirable in the stratified area. Therefore, it is desirable that full load operation of a stratified engine avoid stratification of the fuel and instead provide a homogeneous air-fuel mixture throughout the combustion chamber.

Therefore, it is still a further object of this present invention to provide means for preventing stratification of the fuel during full load operating conditions. Stratification, of course, may be avoided by eliminating the air swirl which creates the fuel stratification.

It is therefore another object of the present invention to eliminate the air swirl and thus stratification of the fuel mixture during full load operation by a movable vane in the air intake passageway which directs the intake air into the combustion chamber.

It is still a further object of the present invention to eliminate stratification and air swirl of a stratified engine during full load operation by providing a second intake valve port which may be used to admit air into the combustion chamber in a direction to destroy the air swirl.

A still further object of the present invention is the provision of the introduction of a main fuel charge to the air intake manifold of a stratified engine during the full load operation so as to avoid stratification of the fuel charge at full load conditions.

Other and further objects, features and advantages will be apparent from the following description of presently preferred embodiments of the invention, given for the purpose of disclosure and taken in conjunction with the accompanying drawings, where like character references designate like parts throughout the several views, and where FIGURE 1 is a fragmentary cross-sectional view taken across a cylinder of an internal combustion engine, FIGURE 2 is a cross-sectional view taken along the line 2—2 of FIGURE 1, FIGURE 3 is an elevational view of a combustion chamber showing the stratification of a swirling air-fuel cloud mixture, FIGURE 4 is a fragmentary cross-sectional view taken across the air intake passageway showing the modified air intake passageway for producing air swirl in the combustion chamber, FIGURE 5 is a cross-sectional view taken along the line 5—5 of FIGURE 4, FIGURE 6 is an elevational view showing a movable vane in the air intake passageway for varying the direction and thus flow rate of the air as it enters the combustion chamber, FIGURE 7 is a schematic view of a fuel injector which provides a double injection of the fuel, during each cycle for increased mixing of the fuel with the air, FIGURE 8 is an elevational view of a combustion chamber showing the double swirling air-fuel cloud mixture resulting from the dual injection of fuel, FIGURE 9 is a fragmentary cross-sectional view taken along an air intake passageway to show a side view of the movable vane of FIGURE 6, FIGURE 10 is a fragmentary cross-sectional view across the cylinder of a stratified internal combustion engine including a fuel injector in the intake air manifold for full load operation, FIGURE 11 is a cross-sectional view taken along the line 11—11 of FIGURE 9, and FIGURE 12 is an elevational view illustrating a stratified internal combustion engine having two intake ports and passageways for providing fuel stratification at partial load, but not at full load operation.

Referring now to the drawings, and more particularly to FIGURE 1, the reference numeral 10 generally indicates a cylinder of a stratified spark ignition internal combustion engine of the present invention and includes as is conventional a cylinder 12, a reciprocating piston 14 therein, a cylinder head 16 connected to the cylinder 12 with the cylinder, piston, and head forming a combustion chamber 18. A spark plug 20 is threaded into the head, preferably with the spark gap positioned near the longitudinal axis of the cylinder 12. A fuel injector 22 is positioned to discharge fuel into the combustion chamber 18 with the nozzle of the fuel injector 22 positioned to discharge the fuel toward the head 16 and at an angle A from a plane perpendicular to the longitudinal axis of the cylinder in the range of 0° to 20° and preferably at 10°.

Referring now to FIGURE 2, the underside of the cylinder head 16 is best seen showing the relationship, in a plan view, of the fuel discharge 24 from the fuel injector 22, showing the exhaust valve 26 and the intake valve 28. The swirling action of the air in the combustion chamber 18, as indicated by the arrows in FIGURE 2, is provided by means in the air intake passageway to cause the air to swirl about the cylinder 12 such as disclosed in my above named patent or other means as will more fully be described hereinafter. The injection of the fuel 24 into and against the direction of the swirling air and at the angles A and B produces, as best seen in FIGURE 3, a swirling air-fuel cloud 29 which is concentrated near the center of the combustion chamber 18.

Referring again to FIGURE 1, it is particularly noted that the nozzle of the fuel injector 22 sprays the fuel at an angle A of approximately 10° above the horizontal plane of the cylinder. The injection of this angle has resulted in improved performance for the engine. This washing effect of the cylinder head by the spray injection results in an impingement of a considerable portion of the injector spray upon the inner surface of the cylinder head 16. The improvement in the engine performance with this 10° upward angle of injection is a result of better distribution of fuel in that the impingement of the fuel on the hot cylinder head and subsequent evaporation from this hot surface contributes to an improved stratification of the injected fuel. The evaporation from the inner surface of the cylinder head 16 is now under the influence of the double vortex movement which carries the evaporated fuel to the center of the combustion chamber 18 and thus enriches the fuel air mixture in the region of the spark plug 20.

Proper stratification of the fuel-air mixture also depends considerably on the direction of injection in the horizontal plane. Referring again to FIGURE 2, it has been found that the fuel must be injected into and against the air swirl and at an angle B from the longitudinal axis of the cylinder in the range of 15 to 60°, preferably at 30° to 45°. If the fuel is injected with the air swirl, the walls of the cylinder are wet down, but no stratification mixture in the center of the cylinder of the fuel with air is provided. Tests have proven that injection and stratification are improved by directing the fuel injection at an angle B of 30° from the vertical center line of the cylinder and against the air swirl. This has been substantiated by ignition tests and photography.

A shrouded valve has been utilized in the past to provide an air swirl into combustion cylinders. However, since a shrouded valve extends down into the cylinder during the intake stroke the shroud tends to interfere with the swirl of air and consequently stratification within the cylinder due to the blocking effect of the shroud in its down position. Therefore, a simpler, less expensive, and far less complicated mechanism for providing the air swirl in the cylinder is shown by the modified air passageway in FIGURES 4 and 5. The air intake passageway 32 is modified adjacent the valve seat insert 34 by blocking off or restricting the passageway at the rear or leeward side of the intake valve 36 so as to direct the air out of the inlet valve port as indicated by the arrows in FIGURE 4. The addition of the material 38 to the air inlet passageway 32 provides a smooth restriction which diverts the air to only the windward side of the valve and into a swirling action in the combustion chamber, but which does not interfere with the operation of the valve 36. This restriction is preferable to a shrouded valve as it does not drop down and interfere with the swirling air within the combustion chamber itself. In addition, it is noted that the restriction is shaped so as to allow the valve 36 to seat on the valve insert without interference.

Referring now to FIGURE 7, another factor contributing to the performance of the present stratified charge engine is the existence of a dual injection system instead of the present single injection system. It has been found that a double or consecutive injection of fuel in substantially equal amounts, instead of the normal single injection during a single cycle, results in evidently a better mixture of fuel in the stratified charge and possibly contributes to reducing the noise level of the engine. Double injection may be provided from a conventional single injection system in which the travel of a pressure pulse down an injection line 39 is at a sonic velocity while the injection pump 40 forces a single metered amount of fuel into the injection line. This pulse travels down the injection line 39 and strikes a check valve 42 within the injection nozzle. When the pulse strikes the check valve 42 the valve is opened and part of the fuel 48 is discharged from the nozzle 44 as the primary spray. The pressure pulse is then reflected back down the injection line to the injection pump plunger 40 where it is reflected again back along the line to the check valve 42. The check valve 42 again opens a second time for a secondary discharge of fuel 50. These two separate discharges of fuel may be approximately 15 to 20 engine crank shaft degrees apart and cause two separate clouds 51 and 53 of fuel discharge to be swirling around the center of the cylinder chamber as shown in FIGURE 8 and thus in the vicinity of the spark plug 20 (FIGURE 1) which is approximately centrally located. The combustion characteristics introduced by the two clouds 51 and 53 of fuel swirling within the combustion chamber may be decreasing the rate of energy release within the chamber. And as all previously stratified charge engines have had rough and extremely objectionable combustion noise as a result of a rapid rate of energy release it can be speculated that the double fuel injection is acting to decrease this rate of energy release as there is no objectionable combustion noise generated in the present test engine. The double injection of substantially equal amounts of fuel has been obtained from the use of a single injection system having a relatively long fuel injection line 39 with large passages through the line so as to provide a low level of damping. Of course, any suitable mechanism for producing the desired double injection of fuel may be provided.

In this discussion, all of these features are desirable to improve the operation of a stratified spark ignited internal combustion engine. However, most of the advantages mentioned for the stratified charge engine occur when the engine is operating at partial loads. Of course, when the engine is operating at full load it is more desirable to have a homogeneous charge of air-fuel mixture introduced into the cylinder instead of having an over-rich stratified charge adjacent the spark plug. Therefore, it is desirable at full load and full power operations to avoid stratifying the fuel charge in the engine.

Of course, one way to prevent stratification is to destroy the air swirl which creates the stratified charge. Referring now to FIGURES 6 and 9 it has been found that by introducing a valve 43, such as a half butterfly valve, in the air intake passageway 30 and varying its position, the air swirl in the cylinder 12 may be increased or decreased. By rotating the valve 43 to position 45 the swirl rate may be reduced thereby decreasing the air swirl in the cylinder and thus decreasing the stratification within the cylinder 12. However, it is to be particularly noted that the valve 43 may be used for another purpose and that if the valve is moved to position 47 it will increase the swirl rate. That is, by moving the valve 43 to position 47 half of the intake port is blocked and the flow is all then diverted to the outside of the port so as to increase the swirl rate. Thus, while the valve 43 may be moved to position 45 to reduce the swirl rate at full load condition for reducing the stratification of the engine, it is particularly noted that this structure may be used if desired to vary the swirl rate of the engine when used at partial loads for establishing a correct swirl rate for various speeds and loads, and thus provide the optimum swirl rate for obtaining a stratified charge at partial loads.

Referring now to FIGURES 10 and 11, another feature is shown for avoiding the stratification of the fuel at full load operation. This is accomplished by introducing the main fuel charge at full load into the air intake manifold. Referring now to FIGURE 10, the stratified engine operates as a stratified engine during partial loads and includes the usual cylinder 12, head 16, spark plug 20, a fuel injector 23, preferably injecting the fuel at an angle A towards the head 16 at approximately 10° and having intake passageway 30 and intake valve 28. Thus at partial loads, the engine operates with a stratified charge. However, a means for metering additional fuel such as additional injector 60 is provided which is positioned to discharge fuel into the air intake manifold and air passageway 30 so that the additional fuel is thus drawn into the cylinder 12 during the suction cycle. And as the fuel 62 is drawn into the cylinder 12 at an angle other than the injected fuel from the injector 23, that is, fuel 62 enters at an angle other than the angle B as shown in FIGURE 11, fuel charge 62 therefore will not mix with the air to provide a stratified charge. The fuel 62 is not directed against the incoming swirling charge of air, as indicated by the arrows in FIGURE 11, but is in fact being drawn in the same direction with the swirling air and thus does not meet the conditions necessary to provide a stratified charge centered in the combustion chamber.

Referring now to FIGURE 12 another structure is shown which may be used to eliminate the air swirl in the cylinder and thus avoid stratification of the fuel discharge for full load operating condition. The structure of FIGURE 12 employs two intake valves 64 and 66. Thus, one of the intake valves 64 can be shaped to create an air swirl in the cylinder and will be used for low load operations to provide the desired stratified charge positioned adjacent the longitudinal axis of the combustion chamber for partial load operation. Under this partial load condition the intake port valve 66 is closed, either by closing the valve itself or closing butterfly throttling valve 68. However, on full load conditions, intake valve 66 will be opened to direct air against the direction of the swirling air flow as indicated by the arrows in FIGURE 12 and will completely destroy the swirling effect of the air coming in through intake valve 66.

In operation, the stratified engine as shown in FIGURES 1 and 2 may be operated utilizing the conventional Otto spark ignition cycle. The fuel is preferably injected by the injector 22 at an angle A as shown in FIGURE 1 which is in the range of 0 to 20 degrees from the horizontal, preferably 10 degrees, towards the cylinder head 16 and as shown in FIGURE 2 at an angle B which is in the range of 15 to 60 degrees, preferably 30 degrees in a horizontal plane from the longitudinal axis of the cylinder 12.

While generally, the fuel will be injected when the piston 14 is disposed at the beginning of its compression stroke, the fuel injection could occur in the suction stroke as well as in the compression stroke. The stratified air-fuel mixture is one in which the mixture is non-homogeneously positioned near the center of the cylinder and adjacent the spark plug with a lean or non-combustible mixture provided at the region furthest away from the spark plug or near the walls of the cylinder 12. This stratified fuel charge 29, as best seen in FIGURE 3, is produced by causing the air intake air to rotate or swirl around the cylinder 12 as indicated by the arrows in FIGURES 2 and 3 while the fuel injector injects the fuel against the direction of air rotation. The air intake swirl about the cylinder 12 is caused by drawing the air through the air intake valve 12 and directing it towards the interior walls of the cylinder 12 at an angle so as to cause the air to swirl about the periphery of the combustion chamber 18. The advantage of this type of stratification is that the cloud 29 is provided adjacent the spark plug 20 and thus the spark timing is not critical as the cloud 29 although rotating remains adjacent the spark plug 20 once it has formed.

One of the ways for directing the air flow against and at an angle to the cylinder wall 12 is the use of a conventional shrouded valve (not shown) which blocks the passage of air on the back side of the valve and causes the air coming through the air intake passageway to be directed out only one side of the valve. However, the shrouded valve in its lowered position tends to somewhat interfere with the swirl of air about the combustion chamber. Thus, as best seen in FIGURES 4 and 5, a conventional valve 36 may be utilized, but the air intake passageway 32 may be modified by the addition of a passageway restriction 38 adjacent the back or leeward side of the valve 36 which is smooth in configuration and does not interfere with air flow, but blocks and directs the air as indicated by the arrows to produce the necessary air swirl in the combustion chamber. Yet the restriction 38 does not move down into the combustion chamber so as to interfere with the swirling action of the air. It is also noted that the lower surface of restriction 38 is shaped to receive valve 36 and not interfere with the seating of the valve.

Referring now to FIGURES 7 and 8, a suitable means for providing dual fuel injection during each cycle and its results are best seen. As previously explained, the dual injections 48 and 50 result from the travel of a pressure pulse down the injection line 39 when the pump 40 forces a metered amount of fuel into the line 39. Because of the use of relatively long fuel injection lines 39 with large passages that provide a low level of damping, the pressure pulse is reflected, after it strikes the check valve 42, back down the line to the injection pump plunger 40 where it is again reflected back along the line to the check valve 42 and opens the check valve a second time for providing a dual injection charge from the nozzle 44. This produces, as best seen in FIGURE 8, two clouds 51 and 53 of fuel swirling within the combustion chamber 18 which results in a more effective mixture of the air and fuel, lowers the rate of energy release within the combustion chamber, and reduces rough and objectionable combustion noises which are undesirable especially for an engine in a passenger car.

Therefore, the operation of this stratified engine at partial load will result in a more efficient engine. Experiments have so far proven that it will result in an improvement in fuel economy; will provide an engine which approaches complete combustion of the fuel because of the excess amount of air drawn into the combustion chamber and thus will alleviate the smog problem in our major cities; and will reduce the tendency of the engine to knock as the majority of fuel will be concentrated in the stratified area.

However, it is preferable not to operate an engine with a stratified charge at full load conditions. The reason for this is that the air-fuel mixture in a stratified charge at full load would be richer than desirable. At full load it is preferable to have a more homogeneous air-fuel mixture in the combustion chamber. Therefore, in using the stratified charge engine, it is desirable to eliminate the stratified charge at full load operation. Referring now to FIGURES 6 and 9, the air swirl rate within the combustion chamber may be varied by means of a valve such as a half butterfly valve 43 in the intake passageway 30 which can be varied in position for diverting the direction of the air and changing its swirl rate. By moving the valve 43 to position 45 the air flow is diverted to the outside or windward of the intake valve 28 doubling the swirl rate. Conversely, by changing the valve to position 47 the swirl rate can be reduced to such an extent as to avoid producing a stratified charge. Of course, the valve 43 may also be used in the operation of the engine as a stratified engine as the valve 43 could regulate the swirl rate to obtain the optimum swirl rate condition.

Another method of eliminating the air swirl and the stratified charge is shown in FIGURES 10 and 11 where a second fuel injector 60 or other means for metering fuel is provided to introduce, at full load conditions, a main fuel charge 62 through the air intake manifold. Thus, the charge 62 enters the combustion chamber 18 in a direction with reference to the air swirl so as to avoid providing a stratified charge in the combustion chamber.

A still further method of destroying the air swirl at full load condition is best seen as shown in FIGURE 11 in which two air intake valves are provided. One of the air intake valves 64 provides the air intake for part load conditions and produces the swirling air flow as indicated by the solid arrows. However, for full load condition valve 66 or valve 68 is opened allowing the intake of air through the second intake valve 66 as indicated by the dotted arrows which are in a direction to destroy the air swirl at full load operation.

The present invention, therefore, is well adapted to carry out the objects and obtain the ends and advantages mentioned as well as others inherent therein. While presently preferred embodiments of the invention are given for the purpose of disclosure, numerous changes in the details of construction and arrangement of parts may be made which will readily suggest themselves to those skilled in the art and which are encompassed within the spirit of the invention and the scope of the appended claims.

What is claimed is:
1. An internal combustion engine comprising,
    a cylinder,
    a reciprocating piston therein,
    a cylinder head on said cylinder,
    the opposed surfaces of said piston head and cylinder wall forming a combustion chamber,
    an air intake passageway opening into the combustion chamber,
    means to cause the air passing through said passageway to swirl in said combustion chamber,
    a liquid fuel injector nozzle positioned to discharge fuel into the combustion chamber and at an angle in the range of 0° to 20° to and above a plane perpendicular to the axis of the combustion chamber, said nozzle positioned to discharge fuel against the swirling air and create a stratified fuel mixture in which the combustible rich air-fuel mixture is near the center of the cylinder and the lean air-fuel mixture is along the circumferential wall of the cylinder,
    means connected with said spark plug for creating a spark and igniting the combustible mixture in the center of said cylinder as the piston approaches its top dead center position, and
    fuel metering means positioned to discharge fuel into the air intake passageway during full load operation.
2. An internal combustion engine comprising,
    a cylinder, a reciprocating piston therein,
a cylinder head on said cylinder,
the opposed surfaces of said piston head and cylinder wall forming a combustion chamber,
an air intake passageway opening into the combustion chamber,
means to cause the air passing through said passageway to swirl in said combustion chamber,
a liquid fuel injector nozzle positioned to discharge fuel into the combustion chamber and at an angle in the range of 0° to 20° to and above a plane perpendicular to the axis of the combustion chamber,
said nozzle positioned to discharge fuel against the swirling air and create a stratified fuel mixture in which the combustible rich air-fuel mixture is near the center of the cylinder and the lean air-fuel is along the circumferential wall of the cylinder,
means connected with said spark plug for creating a spark and igniting the combustible mixture in the center of said cylinder as the piston approaches its top dead center position, and
a second air intake passageway opening into the combustion chamber for operation at full load, and
means for directing air from said second air intake passageway against and destroying the air swirl from the first air intake passageway.

3. The improvement in a stratified internal combustion engine having a cylinder, a reciprocating piston therein, a cylinder head on the cylinder with the opposed surfaces of the piston, head, and cylinder wall forming a combustion chamber, a spark plug communicating with the combustion chamber with spark gap positioned adjacent the longitudinal axis of the chamber comprising,
an unthrottled intake passageway opening into the combustion chamber,
means to cause the air passing through said passageway to swirl about the periphery of the cylinder and thus create a stratified fuel mixture in which the richer air-fuel mixture is positioned near the center of the cylinder and the leaner air-fuel mixture is positioned along the circumferential wall of the cylinder,
a liquid fuel injector nozzle positioned to discharge fuel into the combustion chamber toward the head and at an angle of approximately 10° from a plane perpendicular to the longitudinal axis of the cylinder, said nozzle also positioned to discharge fuel at an angle from the longitudinal axis of the cylinder towards the cylinder wall of approximately 30°, and against the swirling air,
means connected to said injector for providing consecutive injections of substantially equal amounts of fuel from the nozzle during each cycle, and
fuel metering means positioned to discharge fuel into the air intake during full load operation.

4. The improvement in a stratified internal combustion engine having a cylinder, a reciprocating piston therein, a cylinder head on the cylinder with the opposed surfaces of the piston, head, and cylinder wall forming a combustion chamber, a spark plug communicating with the combustion chamber with spark gap positioned adjacent the longitudinal axis of the chamber comprising,
an unthrottled intake passageway opening into the combustion chamber,
means to cause the air passing through said passageway to swirl about the periphery of the cylinder and thus create a stratified fuel mixture in which the richer air-fuel mixture is positioned near the center of the cylinder and the leaner air-fuel mixture is positioned along the circumferential wall of the cylinder,
a liquid fuel injector nozzle positioned to discharge fuel into the combustion chamber toward the head and at an angle of approximately 10° from a plane perpendicular to the longitudinal axis of the cylinder, said nozzle also positioned to discharge fuel at an angle from the longitudinal axis of the cylinder towards the cylinder wall of approximately 30°, and against the swirling air,
means connected to said injector for providing consecutive injections of substantially equal amounts of fuel from the nozzle during each cycle, and
means for varying the air swirl rate in said combustion chamber.

5. The improvement in a stratified internal combustion engine having a cylinder, a reciprocating piston therein, a cylinder head on the cylinder with the opposed surfaces of the piston, head, and cylinder wall forming a combustion chamber, a spark plug communicating with the combustion chamber with spark gap positioned adjacent the longitudinal axis of the chamber comprising,
an unthrottled intake passageway opening into the combustion chamber,
means to cause the air passing through said passageway to swirl about the periphery of the cylinder and thus create a stratified fuel mixture in which the richer air-fuel mixture is positioned near the center of the cylinder and the leaner air-fuel mixture is positioned along the circumferential wall of the cylinder,
a liquid fuel injector nozzle positioned to discharge fuel into the combustion chamber toward the head and at an angle of approximately 10° from a plane perpendicular to the longitudinal axis of the cylinder, said nozzle also positioned to discharge fuel at an angle from the longitudinal axis of the cylinder towards the cylinder wall of approximately 30°, and against the swirling air, and
means connected to said injector for providing consecutive injections of substantially equal amounts of fuel from the nozzle during each cycle,
a second air intake passageway opening into the combustion chamber for operation at full load, and
means for directing air from said second air intake passageway against and destroying the air swirl from the first air intake passageway.

6. The improvement in a stratified internal combustion engine having a cylinder, a reciprocating piston therein, a cylinder head connected to said cylinder with the opposed surfaces of said piston, cylinder wall and head forming a combustion chamber, a spark plug in said head and positioned near the longitudinal axis of the cylinder, comprising,
an air intake passageway opening into the combustion chamber,
means to cause the air passing through said passageway to swirl in said cylinder and create a stratified fuel mixture in which the combustible rich air-fuel mixture is positioned adjacent the center of the cylinder and the lean fuel air mixture is positioned along the periphery of the cylinder wall,
a liquid fuel injector nozzle positioned to discharge fuel into the combustion chamber toward the head and at an angle of approximately 10° from a plane perpendicular to the longitudinal axis of the cylinder towards the cylinder wall of approximately 30°, and against the swirling air, and
means for preventing stratification of the fuel during full load operation of the engine.

7. The invention of claim 6 including,
fuel metering pumping means for providing consecutive injections of substantially equal amounts of fuel during each cycle.

8. The invention of claim 6 wherein the means for preventing stratification during full load includes,
fuel metering means connected to the air intake manifold, and
means for introducing fuel into said air intake manifold during full load conditions to reduce the effects of stratification of said engine under full load.

9. The invention of claim 6 wherein said means for preventing stratification includes,
means adjacent the intake valve for varying the air swirl rate into said combustion chamber.

10. The invention of claim 6 wherein said means for preventing stratification includes,
a directional valve pivotly mounted in said air intake passageway.

11. The invention of claim 6 wherein said means for preventing stratification includes,
a second air intake passageway opening into said combustion chamber, and
means for directing air from said second air intake passageway against and destroying the air swirl from the first air intake passageway.

12. The invention of claim 6 wherein said means for causing the air to swirl includes,
an air intake valve in said head and passageway,
a restriction in the upstream side of the passageway and above said valve thereby directing the passage of air out of downstream side of the valve, 13. The improvement in a stratified internal combustion engine having a combustion chamber, a spark plug in said head and positioned near the longitudinal axis of the combustion chamber comprising,
an unthrottled air intake valve opening into the combustion chamber,
means to cause the air passing through said valve to swirl in said combustion chamber and when mixed with fuel to create a stratified fuel mixture in which the combustible rich air-fuel mixture is in the center of the combustion chamber and lean air-fuel mixture is along the inner periphery wall of the combustion chamber,
a liquid fuel injector nozzle positioned to discharge fuel into the combustion chamber and against the direction of the rotating air, and
means for eliminating the air swirl in the combustion chamber during full load operation of the engine.

14. The invention of claim 13 wherein said means for eliminating air swirl includes,
fuel metering means connected to the air intake manifold, and
means for injecting fuel into said air intake manifold during full load conditions.

15. The invention of claim 13 where said means for eliminating air swirl includes,
valve means adjacent the air inlet valve for varying the air swirl rate in said combustion chamber.

16. The invention of claim 13 wherein said means for eliminating air swirl includes,
a second air intake valve opening into the combustion chamber for operation at full load, and
means for directing air from said second intake valve against and destroying the air swirl from the first intake valve.

References Cited in the file of this patent

UNITED STATES PATENTS

| | | |
|---|---|---|
| 2,058,487 | Mock | Oct. 27, 1936 |
| 2,306,364 | Skaredoff | Dec. 22, 1942 |
| 2,412,821 | Malin et al. | Dec. 17, 1946 |
| 2,595,915 | Barber | May 6, 1952 |
| 2,920,613 | Vogel et al. | Jan. 12, 1960 |
| 3,035,558 | Wiebicke et al. | May 22, 1962 |
| 3,045,655 | Formia | July 24, 1962 |